(12) United States Patent
Yamasaki et al.

(10) Patent No.: US 7,803,272 B2
(45) Date of Patent: Sep. 28, 2010

(54) WATER TREATMENT SYSTEM

(75) Inventors: Kazuyuki Yamasaki, Hiroshima (JP);
Kazuyuki Sakata, Fukuyama (JP);
Kazumi Chuhjoh, Takamatsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 412 days.

(21) Appl. No.: 11/992,156

(22) PCT Filed: Feb. 28, 2006

(86) PCT No.: PCT/JP2006/303668

§ 371 (c)(1),
(2), (4) Date: Mar. 17, 2008

(87) PCT Pub. No.: WO2007/034582

PCT Pub. Date: Mar. 29, 2007

(65) Prior Publication Data

US 2009/0145827 A1   Jun. 11, 2009

(30) Foreign Application Priority Data

Sep. 21, 2005   (JP)   ............... 2005-273562

(51) Int. Cl.
*B01D 33/70*   (2006.01)
(52) U.S. Cl. .................. 210/150; 210/151; 210/167.01; 210/196; 210/220; 210/263
(58) Field of Classification Search ......... 210/150–151, 210/167.01, 196, 220, 263
See application file for complete search history.

(56) References Cited

U.S. PATENT DOCUMENTS 5,160,438 A * 11/1992 Detsch ....................... 210/707
(Continued)

FOREIGN PATENT DOCUMENTS

JP   9-070598 A   3/1997
(Continued)

OTHER PUBLICATIONS

The International Search Report, Form PCT/ISA/210 for PCT/JP2006/303668 (4 pages), (2006).

*Primary Examiner*—Chester T Barry
(74) *Attorney, Agent, or Firm*—Edwards Angell Palmer & Dodge LLP; David G. Conlin; Lisa Swiszcz Hazzard

(57) ABSTRACT

A first treatment tank (1) to a fourth treatment tank are installed prior to ultrapure water production apparatus (5), dilute wastewater recovering apparatus (34), general service water recovering apparatus and wastewater treatment apparatus. The treatment tanks (1, 2, . . . ) each have a micro-nano bubble generation tank (6, 23, . . . ) and an anaerobic measuring tank (7, 24, . . . ). Accordingly, microbes within the respective anaerobic measuring tanks (7, 24, . . . ) are activated by micro-nano bubbles generated in each micro-nano bubble generation tank (6, 23, . . . ) to thereby enhance the treatment efficiency of low-concentration organic matter. Further, when the value measured by dissolved oxygen meter (13, 30, . . . ) or oxidation-reduction potentiometer (14, 31, . . . ) of each anaerobic measuring tank (7, 24, . . . ) exceeds an individually determined given range, the rotational speed of a circulating pump (9, 26, . . . ) is controlled to thereby decrease the generation of micro-nano bubbles. Thus, the micro-nano bubble content in water undergoing treatment is held appropriate.

12 Claims, 4 Drawing Sheets

U.S. PATENT DOCUMENTS

| | | | |
|---|---|---|---|
| 5,458,778 A * | 10/1995 | Stuckmann et al. | 210/603 |
| 5,788,838 A | 8/1998 | Yamasaki et al. | |
| 6,238,569 B1 * | 5/2001 | Favret, Jr. | 210/710 |
| 2006/0054205 A1 | 3/2006 | Yabe et al. | |
| 2006/0284325 A1 | 12/2006 | Kohama et al. | |

FOREIGN PATENT DOCUMENTS

| | | |
|---|---|---|
| JP | 9-155371 A | 6/1997 |
| JP | 10-249392 A | 9/1998 |
| JP | 2001-058142 A | 3/2001 |
| JP | 2002-143885 A | 5/2002 |
| JP | 2003-334548 | 11/2003 |
| JP | 2004-121962 A | 4/2004 |
| JP | 2004-321959 | 11/2004 |
| JP | 2005-169359 A | 6/2005 |

* cited by examiner

WATER TREATMENT SYSTEM

TECHNICAL FIELD

The present invention relates to a water treatment system including a pretreatment apparatus which pretreats the water to be introduced.

BACKGROUND ART

For water treatment, there exist several typical kinds of pretreatment apparatuses and pretreatment methods. As an example, for biological wastewater treatment apparatuses, there are pretreatment apparatuses such as apparatuses performing settling, filtration, pH control, ozone oxidization and adsorption.

The object of these pretreatment apparatuses is to reduce biological, chemical, or physical load on the wastewater treatment apparatus in the next step. The expected effects of these apparatuses include downsizing of the wastewater treatment apparatuses, reduction in running costs, and improvement of the water quality of the treated water from the wastewater treatment apparatuses.

However, the conventional pretreatment apparatuses cannot achieve considerable increase of the micro-nano bubble concentration in water under treatment so as to sustain high micro-nano bubble concentration over a long time till the next step, nor perform treatment with new functions such as a cleaning function and a weak sterilization function for membrane devices. Herein, the micro-nano bubbles includes both the micro bubbles with a diameter equal to or smaller than 50 microns and larger than 1 micron and the nano bubbles with a diameter equal to or smaller than 1 micron.

Moreover, the conventional pretreatment apparatuses have a general aeration function by a blower but do not have a treatment function with the micro-nano bubbles. It is to be noted that the pretreatment apparatuses with the micro-nano bubbles have a function to maintain the concentration of dissolved oxygen high till the next step for a long time.

Conventional method and apparatus for using nano bubbles have been disclosed in JP 2004-121962 A. This conventional method and apparatus for using nano bubbles utilize such characteristics of nano bubbles as decrease in buoyancy, increase in surface area, increase in surface activity, generation of local high pressure fields, a surface active property attained by achievement of electrostatic polarization and an antiseptic property. More specifically, it has been disclosed that by associating these characteristics with each other, a fouling component adsorption function, a substance surface high-speed cleaning and an antiseptic function allow advanced cleaning of various substances with low environmental load so that purification of contaminated water becomes possible.

However, it has not been disclosed:
(1) that the micro-nano bubbles are generated in a micro-nano bubble generation tank, and the water under treatment containing the micro-nano bubbles is introduced into an anaerobic measuring tank so as to optimize the generation state of the micro-nano bubbles with use of values of dissolved oxygen concentration and oxidation reduction potential; or
(2) that in stages prior to each of (a) an ultrapure water production apparatus composed of a pretreatment apparatus, a primary pure water production apparatus and a secondary water purifying apparatus, (b) a dilute wastewater recovering apparatus, (c) a general service water recovering apparatus, and (d) a wastewater treatment apparatus, a treatment tank which is composed of a micro-nano bubble generation tank and an anaerobic measuring tank is placed.

Further, there is a method for generating nano air bubbles disclosed in JP 2003-334548 A. This method for generating nano air bubbles includes step (i) for gasifying part of liquid by decomposition in liquids, step (ii) for applying ultrasonic waves in liquids, or step (iii) composed of a step for gasifying part of liquid by decomposition and a step for applying ultrasonic waves.

However, it has not been disclosed that:
(3) that the micro-nano bubbles are generated in the micro-nano bubble generation tank, and the water under treatment containing the micro-nano bubbles is introduced into an anaerobic measuring tank to optimize the generation state of the micro-nano bubbles with use of values of dissolved oxygen concentration and oxidation reduction potential; or
(4) that in stages prior to each of (a) an ultrapure water production apparatus composed of a pretreatment apparatus, a primary pure water production apparatus and a secondary water purifying apparatus, (b) a dilute wastewater recovering apparatus, (c) a general service water recovering apparatus, and (d) a wastewater treatment apparatus, a treatment tank which is composed of a micro-nano bubble generation tank and an anaerobic measuring tank is placed.

Further, there is an apparatus for treating waste fluid disclosed in JP 2004-321959 A. In this apparatus for treating waste fluid, ozone gas generated by an ozonizer and waste liquid drawn from the bottom of a treatment tank are fed to a micro bubble generator through a pressurization pump. It has also been disclosed that the waste fluid in the treatment tank is aerated by the generated ozone micro bubbles sent from the opening of a gas blow-off pipe.

However, it has not been disclosed:
(5) that the micro-nano bubbles are generated in the micro-nano bubble generation tank, and the water under treatment containing the micro-nano bubbles is introduced into an anaerobic measuring tank to optimize the generation state of the micro-nano bubbles with use of values of dissolved oxygen concentration and oxidation reduction potential; or
(6) that in stages prior to each of (a) an ultrapure water production apparatus composed of a pretreatment apparatus, a primary pure water production apparatus and a secondary water purifying apparatus, (b) a dilute wastewater recovering apparatus, (c) a general service water recovering apparatus, and (d) a wastewater treatment apparatus, a treatment tank which is composed of a micro-nano bubble generation tank and an anaerobic measuring tank is placed.

Although various types of pretreatment apparatuses are conventionally present as the pretreatment apparatus for membrane devices as described above, no pretreatment apparatus is present which is capable of effectively preventing clogging phenomenon of membrane devices and enhancing the capability of the membrane devices with use of simple devices which are low in cost, easy to maintain and energy saving.

SUMMARY OF THE INVENTION

It is an object of the present invention to provide a water treatment system capable of optimizing the generation state of micro-nano bubbles when adding the micro-nano bubbles to water under treatment for its treatment.

In order to solve the above problem, a water treatment system according to the present invention comprises a micro-nano bubble generation tank having a micro-nano bubble generator for generating micro-nano bubbles including both micro bubbles and nano bubbles, wherein the micro-nano bubble generation tank receives water introduced from outside and adds the micro-nano bubbles into the introduced water; and an anaerobic measuring tank for applying an anaerobic treatment to the water introduced from the micro-nano bubble generation tank and measuring a content of the micro-nano bubbles in the water under treatment.

According to the structure, it becomes possible to measure the content of the micro-nano bubbles in the water to be treated introduced from the micro-nano bubble generation tank in the anaerobic measuring tank. This makes it possible to check the generated amount of the micro-nano bubbles in the micro-nano bubble generation tank and to optimize the generation state of the micro-nano bubbles based on the result of a measurement of the micro-nano bubble content.

In one embodiment, the water treatment system includes an ultrapure water production apparatus having at least a pretreatment apparatus, and the anaerobic measuring tank is placed in a stage prior to the pretreatment apparatus.

According to this embodiment, pretreatment of water to be introduced into the pretreatment apparatus in the ultrapure water production apparatus is performed by the micro-nano bubble generation tank and the anaerobic measuring tank. Therefore, the treatment load of the pretreatment apparatus is reduced.

In one embodiment, The water treatment system includes an ultrapure water production apparatus having at least a primary pure water production apparatus, and the anaerobic measuring tank is placed in a stage prior to the primary pure water production apparatus.

According to this embodiment, pretreatment of water to be introduced into the primary pure water apparatus in the ultrapure water production apparatus is performed by the micro-nano bubble generation tank and the anaerobic measuring tank. Therefore, the treatment load of the primary pure water production apparatus is reduced. Further, the micro-nano bubbles contained in the treated water has an effect to alleviate such problems as the clogging phenomenon of membranes in the primary pure water production apparatus and the decrease in filtration flow rate of the membranes, resulting in increased treatment capacity of the membrane device. Therefore, it becomes possible to lengthen the life of the membranes in the primary pure water production apparatus and to thereby reduce running costs as well as to enhance the treatment performance.

In one embodiment, the water treatment system includes an ultrapure water production apparatus having at least a primary pure water production apparatus and a secondary pure water production apparatus, and the anaerobic measuring tank is placed prior to the secondary pure water production apparatus.

According to this embodiment, pretreatment of water to be introduced into the secondary pure water apparatus in the ultrapure water production apparatus is performed by the micro-nano bubble generation tank and the anaerobic measuring tank. Therefore, the treatment load of the secondary pure water production apparatus is reduced. Further, the micro-nano bubbles contained in the treated water has an effect to alleviate such problems as the clogging phenomenon of membranes in the secondary pure water production apparatus and the decrease in filtration flow rate of the membranes, resulting in increased treatment capacity of the membrane device. Therefore, it becomes possible to lengthen the life of the membranes in the primary pure water production apparatus and to thereby reduce running costs as well as to enhance the treatment performance.

In one embodiment, The water treatment system further includes:

an ultrapure water production apparatus including a pretreatment apparatus, a primary pure water production apparatus, and a secondary water production apparatus;

an in-plant point of use which is a spot in a plant where ultrapure water produced by the ultrapure water production apparatus is used;

a dilute wastewater recovering apparatus for treating and recovering dilute wastewater generated in the in-plant point of use;

a general service water recovering apparatus for treating and recovering concentrated wastewater generated in the in-plant point of use;

a cooling tower and scrubber which reuses treated water collected by the general service water recovering apparatus;

a wastewater treatment apparatus for treating and discharging concentrated wastewater generated in the in-plant point of use; and an activated carbon adsorption apparatus placed in a stage prior to the dilute wastewater recovering apparatus, wherein the dilute wastewater generated in the in-plant point of use is introduced and treated in the micro-nano bubble generation tank and the anaerobic measuring tank, resultant treated water is treated and recovered by the activated carbon adsorption apparatus and the dilute wastewater recovering apparatus, and resultant recovered water is introduced into the primary pure water production apparatus in the ultrapure water production apparatus for reuse.

According to this embodiment, the micro-nano bubble generation tank and the anaerobic measuring tank enable the pretreatment of the dilute wastewater which is generated in the in-plant point of use and is introduced into the activated carbon adsorption apparatus and the dilute wastewater recovering apparatus. Therefore, the treatment load of the activated carbon adsorption apparatus and the dilute wastewater recovering apparatus is reduced.

In one embodiment, the concentrated wastewater generated in the in-plant point of use is introduced and treated in the micro-nano bubble generation tank and the anaerobic measuring tank, resultant treated water is treated and recovered by the general service water recovering apparatus, and resultant recovered water is reused in the cooling tower and scrubber.

According to this embodiment, the micro-nano bubble generation tank and the anaerobic measuring tank enables the pretreatment of the concentrated wastewater which is generated in the in-plant point of use and is introduced into the general service water recovering apparatus. Therefore, the treatment load of the general service water recovering apparatus is reduced.

In one embodiment, the concentrated wastewater generated in the in-plant point of use is introduced and treated in the micro-nano bubble generation tank and the anaerobic measuring tank, and resultant treated water is treated again by the wastewater treatment apparatus before being discharged.

According to this embodiment, the micro-nano bubble generation tank and the anaerobic measuring tank enables the pretreatment of the concentrated wastewater which is generated in the in-plant point of use and is introduced into the wastewater treatment apparatus. Therefore, the treatment load of the wastewater treatment apparatus is reduced.

In one embodiment, the water treatment system further includes a micro-nano bubble generation aid tank for storing a micro-nano bubble generation aid to be added to the micro-nano bubble generation tank.

According to this embodiment, the micro-nano bubble generation aid stored in the micro-nano bubble generation aid tank is added to the micro-nano bubble generation tank. Therefore, it becomes possible to effectively and efficiently generate the micro-nano bubbles in the micro-nano bubble generation tank. That is, it becomes possible to optimize the generation state of the micro-nano bubbles.

In one embodiment, the micro-nano bubble generation aid stored in the micro-nano bubble generation aid tank comprises alcohols or salts including common salt.

In this embodiment, the micro-nano bubble generation aid, which is alcohols or salts including common salt, is easily obtained at low costs. Further, since the alcohols and salts are easy to remove at the post-stage membrane device, they do not have an adverse effect on the membrane device.

In one embodiment, a dissolved oxygen meter and/or an oxidation-reduction potentiometer is placed in the anaerobic measuring tank.

The micro-nano bubbles are sustainable for a long time in water, and therefore if the micro-nano bubble generator in the micro-nano bubble generation tank is kept on operating, the content of the micro-nano bubbles in the water under treatment becomes excessive, which may exert an adverse effect on the treatment apparatus in the subsequent stage.

According to this embodiment, a dissolved oxygen meter and/or an oxidation-reduction potentiometer is placed in the anaerobic measuring tank. Therefore, based on the measuring result by the dissolved oxygen meter and/or the oxidation-reduction potentiometer, possible influence of the micro-nano bubbles in the water under treatment on the treatment apparatus in the subsequent stage can be checked.

In one embodiment, the anaerobic measuring tank is filled with a polyvinylidene chloride filling.

According to this embodiment, the microorganisms which propagate in the polyvinylidene chloride filling are activated by the micro-nano bubbles, which enhances the treatment efficiency of the low-concentration organic matter in the water under treatment.

Further, it becomes possible to make the microorganisms consume oxygen under the existence of the micro-nano bubbles. When a large amount of the micro-nano bubbles flow from the micro-nano bubble generation tank in the state where oxygen is being consumed, the dissolved oxygen concentration and the oxidation reduction potential in the anaerobic measuring tank rise. Therefore, it becomes possible to measure the sustaining state of the micro-nano bubbles by measuring the dissolved oxygen concentration and/or the oxidation reduction potential in the anaerobic measuring tank.

In one embodiment, the micro-nano bubble generator in the micro-nano bubble generation tank is a cavitation-type micro-nano bubble generator.

According to this embodiment, the micro-nano bubble generation tank is equipped with a cavitation-type micro-nano bubble generator. Therefore, even if water under treatment is recovered water with sufficient water quality such as dilute wastewater in chip fabrication plants, tap water and fresh water, micro-nano bubbles can efficiently be generated.

As is apparent from the above, it becomes possible to measure the content of the micro-nano bubbles in the water to be treated introduced from the micro-nano bubble generation tank in the anaerobic measuring tank. Accordingly, it is possible to check the generated amount of the micro-nano bubbles in the micro-nano bubble generation tank and also to optimize the generation state of the micro-nano bubbles based on the result of a measurement of the micro-nano bubble content.

If the anaerobic measuring tank is filled with a polyvinylidene chloride filling, the microorganisms which propagate in the polyvinylidene chloride filling are activated by the micro-nano bubbles, which enhances the treatment efficiency of the low-concentration organic matter in the water under treatment.

Moreover, if the micro-nano bubble generation tank and the anaerobic measuring tank are placed in stages prior to the ultrapure water production apparatus, the activated carbon adsorption apparatus and the dilute wastewater recovering apparatus which treat and recover the dilute wastewater generated in an in-plant point of use, the general service water recovering apparatus which treats and recovers concentrated wastewater generated in the in-plant point of use, or the wastewater treatment apparatus which treats and discharges the concentrated wastewater generated in the in-plant point of use, it becomes possible to reduce the treatment load on the respective apparatuses which constitute the ultrapure water production apparatus, the activated carbon adsorption apparatus, the dilute wastewater recovering apparatus, the general service water recovering apparatus, and the wastewater treatment apparatus.

Moreover, if at least either the dissolved oxygen meter or the oxidation-reduction potentiometer is placed in the anaerobic measuring tank, it becomes possible to check an influence of the micro-nano bubbles in water under treatment on the treatment apparatus in the subsequent stage based on the measuring result of the dissolved oxygen meter and the oxidation-reductions potentiometer.

Moreover, if the micro-nano bubble generation aid stored in the micro-nano bubble generation aid tank is added to the micro-nano bubble generation tank, it becomes possible to effectively and efficiently generate the micro-nano bubbles as well as to optimize the generation state of the micro-nano bubbles.

DESCRIPTION OF REFERENCE NUMERAL

Figure 1:
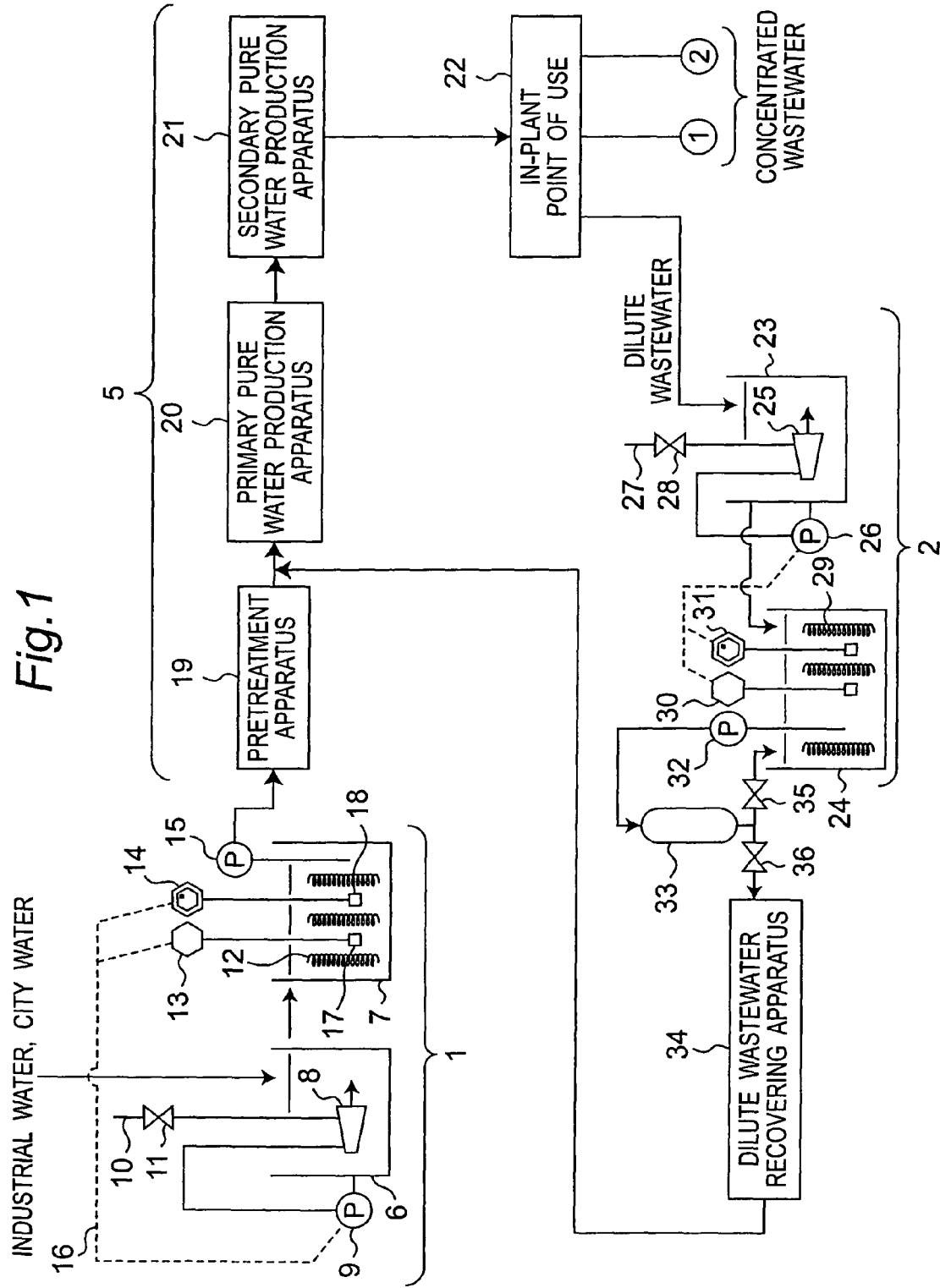
FIG. 1 is a partial structure view of a water treatment system in the present invention.

1: First treatment tank,
2: Second treatment tank,
3: Third treatment tank,
4: Fourth treatment tank
5: Ultrapure water production apparatus,
6, 23, 37, 49: Micro-nano bubble generation tank
7, 24, 38, 50: Anaerobic measuring tank,
8, 25, 39, 51: Micro-nano bubble generator
9, 26, 40, 52: Circulating pump
10, 27, 41, 53: Air suction pipe,
12, 29, 43, 55: Polyvinylidene chloride filling
13, 30, 44, 56: Dissolved oxygen meter,
14, 31, 45, 57: Oxidation-reduction potentiometer,
19: Pretreatment apparatus,
20: Primary pure water production apparatus
21: secondary pure water production apparatus, 22: In-plant point of use
33: Activated carbon adsorption apparatus,
34: Dilute wastewater recovering apparatus,
47: General service water recovering apparatus,
48: Cooling tower and scrubber,
59: Wastewater treatment apparatus,
61, 63, 65, 67: Micro-nano bubble generation aid tank
62, 64, 66, 68: Metering pump

DETAILED DESCRIPTION OF THE INVENTION

Hereinbelow, the present invention will be described in details in conjunction with the embodiments with reference to the drawings.

First Embodiment

Figure 2:
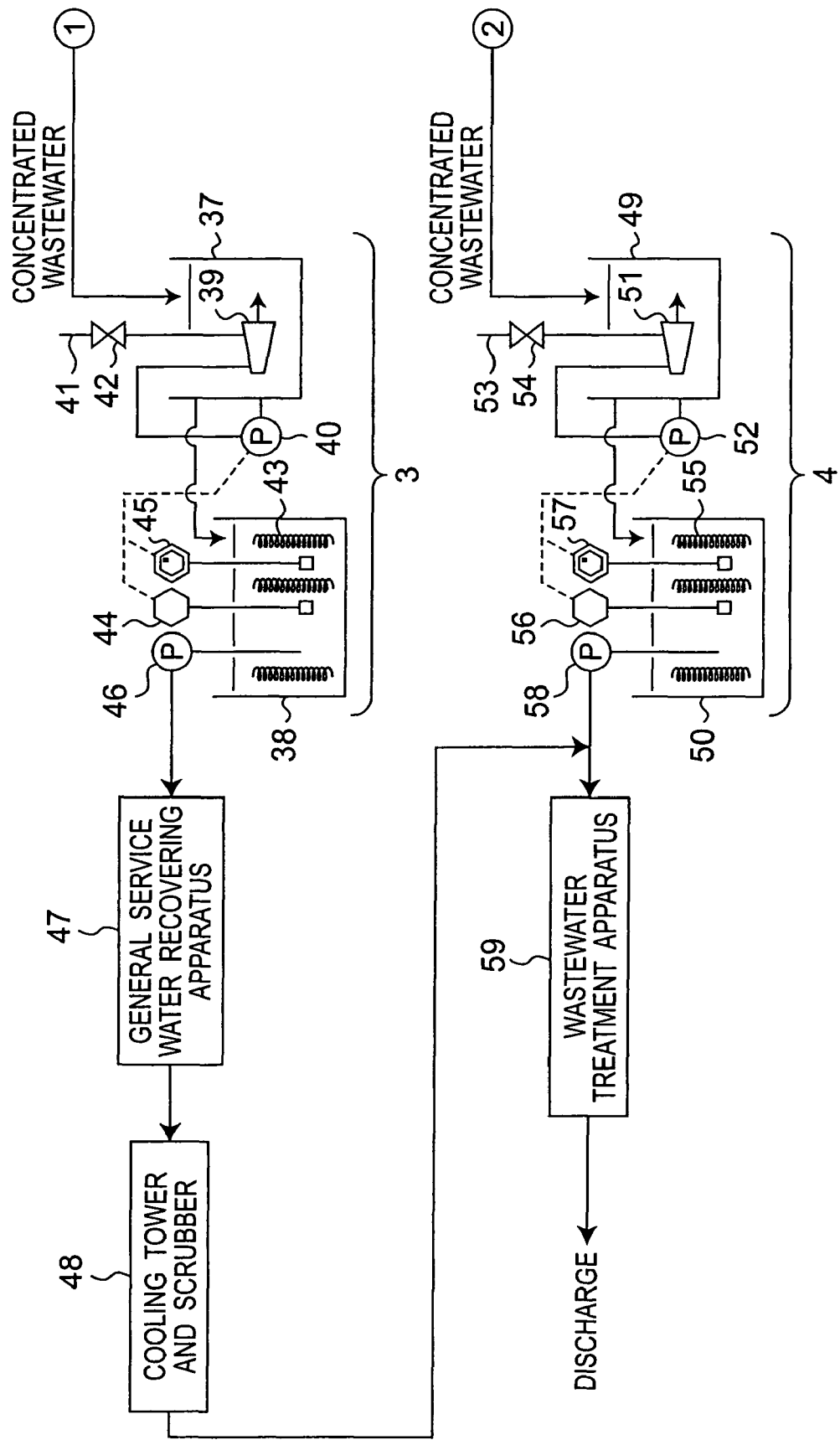
FIG. 2 is a partial structure view continuing from FIG. 1.

FIGS. 1 and 2 are schematic structure views of a water treatment system in the present embodiment, and more specifically are schematic structure views of a water treatment system in a chip fabrication plant or a liquid crystal plant. This water treatment equipment is structured as a fully closed system-type water treatment system for use in conventional chip fabrication plants or liquid crystal plants, the water treatment system additionally equipped with a first treatment tank 1, a second treatment tank 2, a third treatment tank 3, and a fourth treatment tank 4 for effective water treatment with micro-nano bubbles added to water under treatment. Each of the first treatment tank 1, the second treatment tank 2, the third treatment tank 3, and the fourth treatment tank 4 is composed of a micro-nano bubble generation tank and an anaerobic measuring tank as described later in detail.

Description is first given of the first treatment tank 1 placed in a stage prior to an ultrapure water production apparatus 5. The first treatment tank 1 is composed of a first micro-nano bubble generation tank 6 and a first anaerobic measuring tank 7. The first micro-nano bubble generation tank 6 receives industrial water or city water as water to be treated.

Inside the first micro-nano bubble generation tank 6, a micro-nano bubble generator 8 is placed, while outside thereof, a circulating pump 9 is placed. With the circulating pump 9, the water in the first micro-nano bubble generation tank 6 is pumped to the micro-nano bubble generator 8. As a result, the micro-nano bubble generator 8 generates micro-nano bubbles, while sucking the air supplied from an air suction pipe 10 connected thereto. It is to be noted that the air suction pipe 10 is equipped with a valve 11 for adjusting the amount of air so as to facilitate generation of optimal micro-nano bubbles. Any product may be used as the micro-nano bubble generator 8, such as the products made by Aura Tec Corporation and Nanoplanet Research Institute Corporation. The industrial water as water to be treated introduced into the first micro-nano bubble generation tank 6 receives micro-nano bubbles in the first micro-nano bubble generation tank 6, and then it overflows and is introduced into the first anaerobic measuring tank 7.

In the first anaerobic measuring tank 7, a polyvinylidene chloride filling 12, a dissolved oxygen meter 13, an oxidation-reduction potentiometer 14, and a pump 15 are placed. In the polyvinylidene chloride filling 12, microorganisms propagate in the water containing micro-nano bubbles, so that low-concentration organic matter in the water is treated by the microorganisms. In this regard, presence of the micro-nano bubbles and the polyvinylidene chloride filling 12 in the first anaerobic measuring tank 7 activate the microorganisms to thereby enhance the treatment efficiency of the low-concentration organic matter.

The dissolved oxygen meter 13 and the oxidation-reduction potentiometer 14 measure the dissolved oxygen concentration and the oxidation reduction potential in the first anaerobic measuring tank 7 around the clock (24 hours). As for the circulating pump 9, the rotational speed is inverter-controlled. When a measured value of the dissolved oxygen meter 13 or the oxidation-reduction potentiometer 14 or both the measured values exceed an individually determined given range, the rotational speed of the circulating pump 9 is controlled so that the discharge rate and the discharge pressure of the circulating pump 9 are decreased, and thereby the micro-nano bubbles generated in the micro-nano bubble generator 8 are decreased.

That is, the micro-nano bubbles generated in the first micro-nano bubble generation tank 6 are sustained in the water for a long time. Therefore, when the amount of micro-nano bubbles is larger than necessary, it affects the environment of a primary pure water production apparatus and a secondary pure water production apparatus in the subsequent steps. Accordingly, when the amount of the micro-nano bubbles increases and so the dissolved oxygen concentration by the dissolved oxygen meter 13 and the measured value by the oxidation-reduction potentiometer 14 in the first anaerobic measuring tank 7 rise, the micro-nano bubble generation amount in the micro-nano bubble generator 8 is decreased based on the dissolved oxygen concentration value and the oxidation-reduction potential value, so that the dissolved oxygen concentration by the dissolved oxygen meter 13 and the measured value by the oxidation-reduction potentiometer 14 are kept normal. The dissolved oxygen concentration by the dissolved oxygen meter 13 and the measured value by the oxidation-reduction potentiometer 14 are kept normal in this way, by which the content of the micro-nano bubbles in the first anaerobic measuring tank 7 is kept normal, which prevents the excessive micro-nano bubbles from affecting the primary pure water production apparatus and the secondary pure water production apparatus.

There are provided a signal line 16 for transmitting a control signal from the dissolved oxygen meter 13 and the oxidation-reduction potentiometer 14 to the circulating pump 9, a detection section 17 of the dissolved oxygen meter 13, and a detection section 18 of the oxidation-reduction potentiometer 14.

Next, the water under treatment in the first anaerobic measuring tank 7 is introduced by a pump 15 into a pretreatment apparatus 19 which constitutes a part of the ultrapure water production apparatus 5. The pretreatment apparatus 19 includes coagulation sedimentation equipment, rapid filtration equipment, and flocculation filtration equipment.

Next, the water under treatment outgoing from the pretreatment apparatus 19 is introduced into a primary pure water production apparatus 20 which constitutes a part of the ultrapure water production apparatus 5. In this case, since the capability of each membrane device in the primary pure water production apparatus 20 is enhanced by the water under treatment containing the micro-nano bubbles, it becomes possible to considerably lengthen intervals of membrane replacement in each of the membrane devices and to thereby reduce the running costs.

Next, the water under treatment outgoing from the primary pure water production apparatus 20 is introduced into a secondary pure water production apparatus 21 which constitutes a part of the ultrapure water production apparatus 5. The primary pure water production apparatus 20 is equipped with a reverse osmosis membrane device (not shown) and a ventilator (not shown). Therefore, the micro-nano bubbles in the water under treatment are erased the moment the water under treatment leaves the primary pure water production apparatus 20, and the effect thereof is lost. Then, the ultrapure water outgoing from the secondary pure water production apparatus 21 is sent to an in-plant point of use 22 which is a spot in a plant which uses the ultrapure water produced by the ultrapure water production apparatus 5.

As mentioned above, the ultrapure water sent out to the in-plant point of use 22 is used in each manufacturing system (not shown), and then is separated into two kinds, dilute wastewater and concentrated wastewater, while being branched into three systems, a dilute wastewater recovering system, a concentrated wastewater recovering system, and a concentrated wastewater treatment system, before being discharged.

Description is now given of the dilute wastewater recovering system for recovering the dilute wastewater. The dilute wastewater from each of the manufacturing systems is introduced into a second treatment tank 2. The second treatment tank 2 is composed of a second micro-nano bubble generation tank 23 and a second anaerobic measuring tank 24. The dilute wastewater as water under treatment is introduced into the second micro-nano bubble generation tank 23.

Inside the second micro-nano bubble generation tank 23, a micro-nano bubble generator 25 is placed, while outside thereof, a circulating pump 26 is placed. The micro-nano bubble generator 25 is equipped with an air suction pipe 27 which allows regulation of an amount of suction air with a valve 28. The dilute wastewater as water under treatment introduced into the second micro-nano bubble generation tank 23 receives micro-nano bubbles in the second micro-nano bubble generation tank 23, and then it overflows and is introduced into the second anaerobic measuring tank 24.

In the second anaerobic measuring tank 24, a polyvinylidene chloride filling 29, a dissolved oxygen meter 30, an oxidation-reduction potentiometer 31, and a pump 32 are placed. In the polyvinylidene chloride filling 29, microorganisms propagate in the water under treatment containing micro-nano bubbles, so that low-concentration organic matter in the water is treated by the microorganisms. In this regard, presence of the micro-nano bubbles (not shown) and the polyvinylidene chloride filling 29 in the second anaerobic measuring tank 24 activate the microorganisms to thereby enhance the treatment efficiency of the low-concentration organic matter.

The dissolved oxygen meter 30 and the oxidation-reduction potentiometer 31 measure the dissolved oxygen concentration and the oxidation reduction potential in the second anaerobic measuring tank 24 around the clock (24 hours). As for the circulating pump 26, the rotational speed is inverter-controlled. When a measured value of the dissolved oxygen meter 30 or the oxidation-reduction potentiometer 31 or both the measured values exceeds an individually determined given range, the rotational speed of the circulating pump 26 is controlled so that the discharge rate and the discharge pressure of the circulating pump 26 are decreased, and thereby the micro-nano bubbles generated in the micro-nano bubble generator 25 are decreased.

That is, the micro-nano bubbles generated in the second micro-nano bubble generation tank 23 are sustained in the water for a long time. Accordingly, when the amount of the micro-nano bubbles increases more than necessary and the dissolved oxygen concentration by the dissolved oxygen meter 30 and the measured value by the oxidation-reduction potentiometer 31 in the first anaerobic measuring tank 24 rise, the micro-nano bubble generation amount in the micro-nano bubble generator 25 is decreased based on the dissolved oxygen concentration value and the oxidation-reduction potential value, so that the dissolved oxygen concentration by the dissolved oxygen meter 30 and the measured value by the oxidation-reduction potentiometer 31 are kept normal.

It is to be noted that the reference numeral of a signal line for transmitting a control signal from the dissolved oxygen meter 30 and the oxidation-reduction potentiometer 31 to the circulating pump 26, the reference numeral of a detection section of the dissolved oxygen meter 30, and the reference numeral of a detection section of the oxidation-reduction potentiometer 31 are omitted.

The water under treatment from the second anaerobic measuring tank 24 is introduced into a dilute wastewater recovering apparatus 34 via an activated carbon adsorption apparatus 33 by the pump 32, and is treated by the dilute wastewater recovering apparatus 34 till it gains target water quality. In this case, the water under treatment introduced into the activated carbon adsorption apparatus 33 has already been treated in the second treatment tank 2. Therefore, the treatment load of the activated carbon adsorption apparatus 33 and the dilute wastewater recovering apparatus 34 can be reduced. The treated water treated by the dilute wastewater recovering apparatus 34 is introduced into the primary pure water production apparatus 20 of the ultrapure water production apparatus 5 for reuse.

Reference numeral 35 denotes a valve provided in the pipe for returning the treated water from the activated carbon adsorption apparatus 33 to the second anaerobic measuring tank 24. Also, reference numeral 36 denotes a valve provided in the pipe for introducing the treated water from the activated carbon adsorption apparatus 33 into the dilute wastewater recovering apparatus 34.

Description is now given of the concentrated wastewater recovering system for recovering the concentrated wastewater. The concentrated wastewater from each of the manufacturing systems is introduced into a third treatment tank 3. The third treatment tank 3 is composed of a third micro-nano bubble generation tank 37 and a third anaerobic measuring tank 38. The concentrated wastewater as water under treatment is introduced into the third micro-nano bubble generation tank 37.

Inside the third micro-nano bubble generation tank 37, a micro-nano bubble generator 39 is placed, while outside thereof, a circulating pump 40 is placed. The micro-nano bubble generator 39 is equipped with an air suction pipe 41 and a valve 42 for regulating the amount of suction air. The thick wastewater introduced into the third micro-nano bubble generation tank 37 receives micro-nano bubbles in the third micro-nano bubble generation tank 37, and then it overflows and is introduced into the third anaerobic measuring tank 38.

In the third anaerobic measuring tank 38, a polyvinylidene chloride filling 43, a dissolved oxygen meter 44, an oxidation-reduction potentiometer 45, and a pump 46 are placed. In the polyvinylidene chloride filling 43, microorganisms propagate in the water under treatment containing micro-nano bubbles, so that low-concentration organic matter in the water is treated by the microorganisms. In this regard, presence of the micro-nano bubbles (not shown) and the polyvinylidene chloride filling 43 in the third anaerobic measuring tank 38 activate the microorganisms to thereby enhance the treatment efficiency of the low-concentration organic matter.

The dissolved oxygen meter 44 and the oxidation-reduction potentiometer 45 measure the dissolved oxygen concentration and the oxidation reduction potential in the third anaerobic measuring tank 38 around the clock (24 hours). As for the circulating pump 40, the rotational speed is inverter-controlled. When a measured value of the dissolved oxygen meter 44 or the oxidation-reduction potentiometer 45 or both the measured values exceeds an individually determined given range, the rotational speed of the circulating pump 40 is controlled so that the discharge rate and the discharge pressure of the circulating pump 40 are decreased, and thereby the micro-nano bubbles generated in the micro-nano bubble generator 39 are decreased.

That is, the micro-nano bubbles generated in the third micro-nano bubble generation tank 37 are sustained in the water for a long time. Accordingly, when the amount of the micro-nano bubbles increases more than necessary and the dissolved oxygen concentration by the dissolved oxygen meter 44 and the measured value by the oxidation-reduction potentiometer 45 in the third anaerobic measuring tank 38 rise, the micro-nano bubble generation amount in the micro-nano bubble generator 39 is decreased based on the dissolved oxygen concentration value and the oxidation-reduction potential value, so that the dissolved oxygen concentration by the dissolved oxygen meter 44 and the measured value by the oxidation-reduction potentiometer 45 are kept normal.

It is to be noted that reference numeral of a signal line for transmitting a control signal from the dissolved oxygen meter 44 and the oxidation-reduction potentiometer 45 to the circulating pump 40, reference numeral of a detection section of the dissolved oxygen meter 44, and reference numeral of a detection section of the oxidation-reduction potentiometer 45 are omitted.

The water under treatment from the third anaerobic measuring tank 38 is introduced by the pump 46 into a cooling tower and scrubber 48 via a general service water recovering apparatus 47 so as to be reused in the cooling tower and scrubber 48. In this case, the water under treatment introduced into the general service water recovering apparatus 47 has already been treated in the third treatment tank 3. Therefore, the treatment load of the general service water recovering apparatus 47 can be reduced. The treated water after being reused by the cooling tower and scrubber 48 is introduced into a wastewater treatment apparatus 59, where it is treated till it gains target water quality. The treated water thus treated by the wastewater treatment apparatus 59 is discharged.

Description is now given of the concentrated wastewater treatment system for treating the concentrated wastewater. The concentrated wastewater from each of the manufacturing systems is introduced into a fourth treatment tank 4. The fourth treatment tank 4 is composed of a fourth micro-nano bubble generation tank 49 and a fourth anaerobic measuring tank 50. The concentrated wastewater as water to be treated is introduced into the fourth micro-nano bubble generation tank 49.

Inside the fourth micro-nano bubble generation tank 49, a micro-nano bubble generator 51 is placed, while outside thereof, a circulating pump 52 is placed. The micro-nano bubble generator 51 is equipped with an air suction pipe 53 and a valve 54 for regulating the amount of suction air. The concentrated wastewater as water to be treated introduced into the fourth micro-nano bubble generation tank 49 receives micro-nano bubbles in the fourth micro-nano bubble generation tank 49, and then it overflows and is introduced into the fourth anaerobic measuring tank 50.

In the fourth anaerobic measuring tank 50, a polyvinylidene chloride filling 55, a dissolved oxygen meter 56, an oxidation-reduction potentiometer 57, and a pump 58 are placed. In the polyvinylidene chloride filling 55, microorganisms propagate in the water under treatment containing micro-nano bubbles, so that low-concentration organic matter in the water under treatment is treated by the microorganisms. In this regard, presence of the micro-nano bubbles (not shown) and the polyvinylidene chloride filling 55 in the fourth anaerobic measuring tank 50 activate the microorganisms to thereby enhance the treatment efficiency of the low-concentration organic matter.

The dissolved oxygen meter 56 and the oxidation-reduction potentiometer 57 measure the dissolved oxygen concentration and the oxidation reduction potential in the fourth anaerobic measuring tank 50 around the clock (24 hours). As for the circulating pump 52, the rotational speed is inverter-controlled. When a measured value of the dissolved oxygen meter 56 or the oxidation-reduction potentiometer 57 or both the measured values exceeds an individually determined given range, the rotational speed of the circulating pump 52 is controlled so that the discharge rate and the discharge pressure of the circulating pump 52 are decreased, and thereby the micro-nano bubbles generated in the micro-nano bubble generator 51 are decreased.

That is, the micro-nano bubbles generated in the fourth micro-nano bubble generation tank 49 are sustained in the water for a long time. Accordingly, when the amount of the micro-nano bubbles increases more than necessary and the dissolved oxygen concentration by the dissolved oxygen meter 56 and the measured value by the oxidation-reduction potentiometer 57 in the fourth anaerobic measuring tank 50 rise, the micro-nano bubble generation amount in the micro-nano bubble generator 51 is decreased based on the dissolved oxygen concentration value and the oxidation-reduction potential value, so that the dissolved oxygen concentration by the dissolved oxygen meter 56 and the measured value by the oxidation-reduction potentiometer 57 are kept normal.

It is to be noted that the reference numeral of a signal line for transmitting a control signal from the dissolved oxygen meter 56 and the oxidation-reduction potentiometer 57 to the circulating pump 52, reference numerals of a detection section of the dissolved oxygen meter 56, and reference numerals of a detection section of the oxidation-reduction potentiometer 57 are omitted.

The water under treatment from the fourth anaerobic measuring tank 50 is introduced by the pump 58 into the wastewater treatment apparatus 59, and is treated by the wastewater treatment apparatus 59 till it gains target water quality. In this case, the water introduced into the wastewater treatment apparatus 59 has already been treated in the fourth treatment tank 4. Therefore, the treatment load of the wastewater treatment apparatus 59 can be reduced. Then, the treated water treated by the wastewater treatment apparatus 59 is discharged.

As described above in the present embodiment, the first treatment tank 1, the second treatment tank 2, the third treatment tank 3, and the fourth treatment tank 4 are placed in states prior to each of the ultrapure water production apparatus 5, the activated carbon adsorption apparatus 33, the general service water recovering apparatus 47, and the wastewater treatment apparatus 59 in the fully closed system-type water treatment system in chip fabrication plants or liquid crystal plants.

The first treatment tank 1 placed in a stage prior to the ultrapure water production apparatus 5 is composed of a first micro-nano bubble generation tanks 6 and a first anaerobic measuring tanks 7. Therefore, the microorganisms which propagates in the first anaerobic measuring tank 7 is activated by the micro-nano bubbles generated in the first micro-nano bubble generation tank 6, so that the treatment efficiency of the low-concentration organic matter in the first anaerobic measuring tank 7 is enhanced. Further, the capability of each membrane device in the primary pure water production apparatus 20 is enhanced by the water under treatment containing the micro-nano bubbles. This makes it possible to considerably lengthen intervals of membrane replacement in each of the membrane devices and to thereby reduce the running costs.

Further, the dissolved oxygen meter 13 and the oxidation-reduction potentiometer 14 are placed in the first anaerobic measuring tank 7, and when a measured value of the dissolved oxygen meter 13 or the oxidation-reduction potentiometer 14 or both the measured values exceed an individually determined given range, the rotational speed of circulating pump 9 is controlled so that the micro-nano bubbles generated in the micro-nano bubble generator 8 is decreased. Therefore, the excessive micro-nano bubbles are prevented from affecting the primary pure water production apparatus 20 and the secondary pure water production apparatus 21.

Moreover, each of the second treatment tank 2, the third treatment tank 3, and fourth treatment tank 4 placed in stages prior to each of the activated carbon adsorption apparatus 33, the general service water recovering apparatus 47 and the wastewater treatment apparatus 59 is composed of the micro-nano bubble generation tanks 23, 37, 49 and the anaerobic measuring tanks 24, 38, 50, respectively. Therefore, the micro-nano bubbles generated in each micro-nano bubble generation tanks 23, 37, 49 activate the microorganisms which propagate in each anaerobic measuring tanks 24, 38, 50, so that the treatment efficiency of the low-concentration organic matter in each anaerobic measuring tanks 24, 38, 50 are enhanced.

Further, the dissolved oxygen meters 30, 44, 56 and the oxidation-reduction potentiometers 31, 45, 57 are placed in each of the anaerobic measuring tanks 24, 38, 50, and when a measured value of each dissolved oxygen meter 30, 44, 56 or each oxidation-reduction potentiometer 31, 45, 57, or both the measured values exceeds an individually determined given range, the rotational speed of the circulating pumps 26, 40, 52 is controlled, so that the micro-nano bubbles generated in each micro-nano bubble generators 25, 39, 51 are decreased. Therefore, the content of the micro-nano bubbles in treated water can be kept normal.

Second Embodiment

Figure 3:
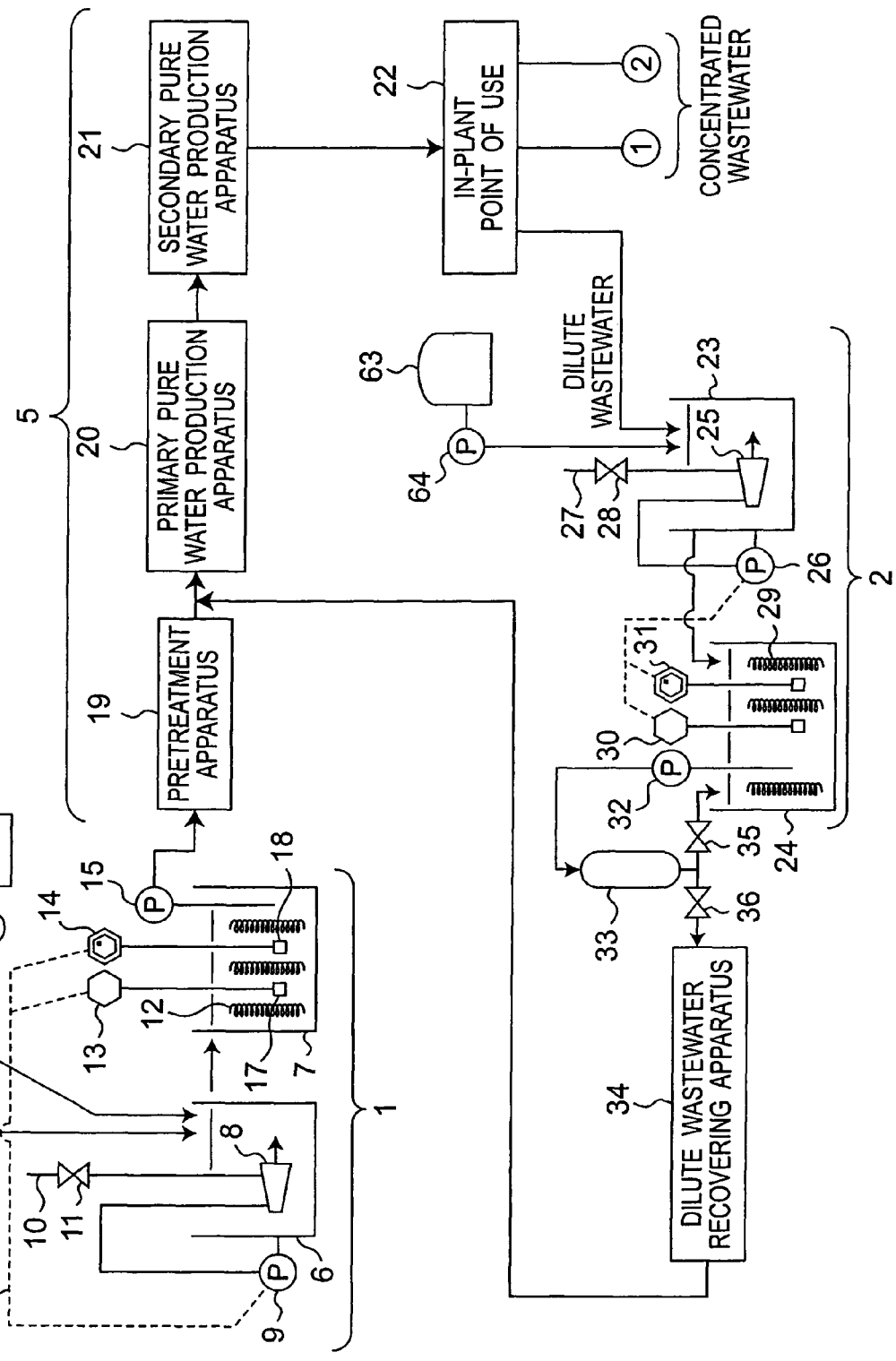
FIG. 3 is a partial structure view of a water treatment system different from that in FIGS. 1 and 2.
Figure 4:
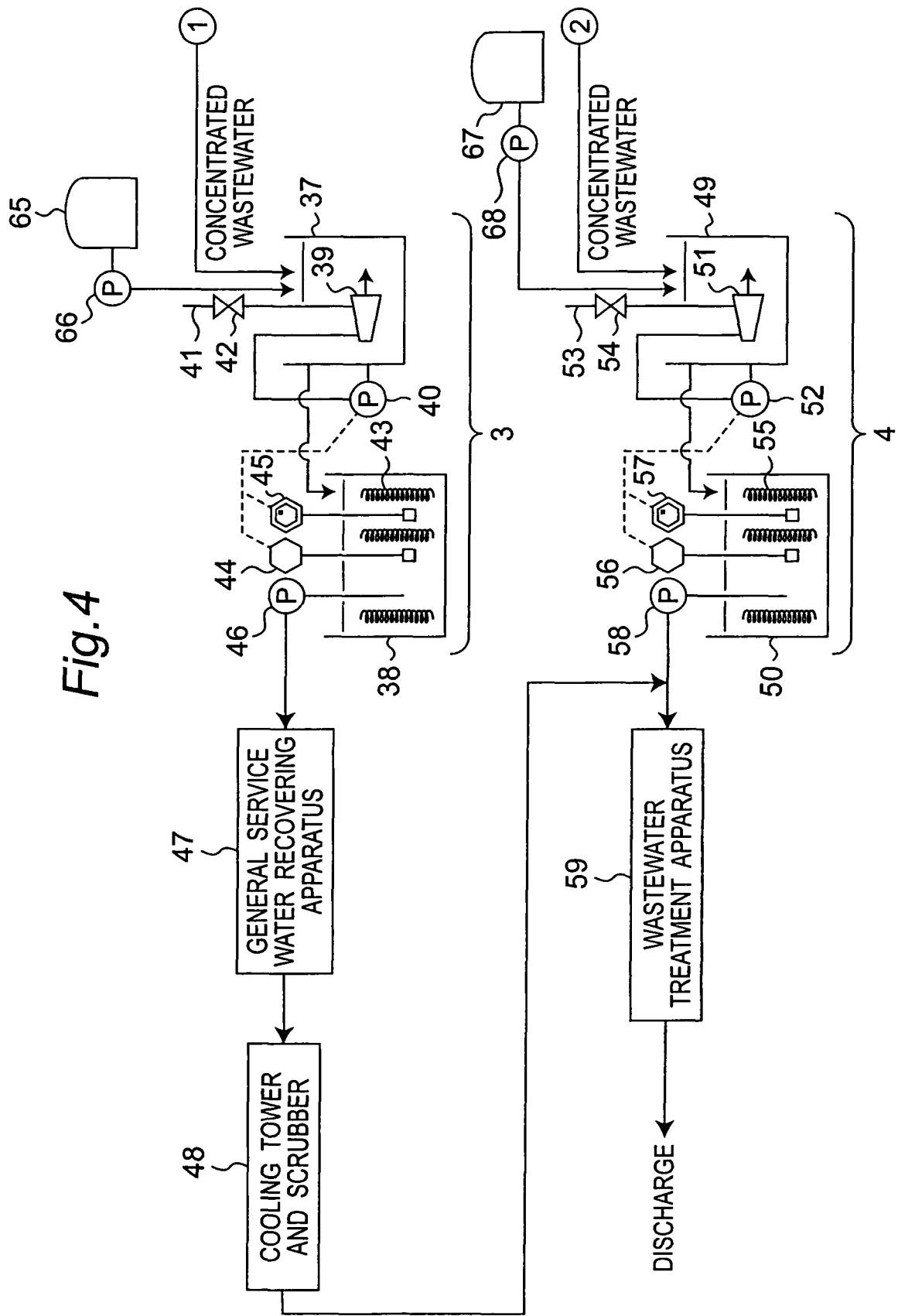
FIG. 4 is a partial structure view continuing from FIG. 3.

FIGS. 3 and 4 are schematic structure views in the water treatment system of the present embodiment. This water treatment system is so structured that a micro-nano bubble generation aid is added to each of the first micro-nano bubble generation tank 6, the second micro-nano bubble generation tank 23, the third micro-nano bubble generation tank 37, and the fourth micro-nano bubble generation tank 49 in the water treatment system of the first embodiment shown in FIGS. 1 and 2.

In FIGS. 3 and 4, the component parts identical to those in the water treatment system of the first embodiment are designated by identical reference numerals to omit detailed description. Description is hereinafter given of component parts different from those in the first embodiment.

In this embodiment, as shown in FIGS. 3 and 4, a micro-nano bubble generation aid from a micro-nano bubble generation aid tank 61 is quantitatively added by a metering pump 62 to the first micro-nano bubble generation tank 6. A micro-nano bubble generation aid from a micro-nano bubble generation aid tank 63 is also quantitatively added by a metering pump 64 to the second micro-nano bubble generation tank 23. A micro-nano bubble generation aid from a micro-nano bubble generation aid tank 65 is also quantitatively added by a metering pump 66 to the third micro-nano bubble generation tank 37. A micro-nano bubble generation aid from a micro-nano bubble generation aid tank 67 is also quantitatively added by a metering pump 68 to the fourth micro-nano bubble generation tank 49.

The reason for adding the micro-nano bubble generation aid to each of the micro-nano bubble generation tanks 6, 23, 37, 49 as disclosed above is to enhance the generating efficiency of micro-nano bubbles. Therefore, since the generation state of micro-nano bubbles may be improved by such measure as changing the types of the micro-nano bubble generators 8, 25, 39, 51, addition of the micro-nano bubble generation is not an absolute condition. For example, when cavitation-type micro-nano bubble generators are used as the micro-nano bubble generators 8, 25, 39, 51, micro-nano bubbles are generated even when the treated water is recovered water with sufficient water quality such as the dilute wastewater, tap water and fresh water. In that case, therefore, addition of the micro-nano bubble generation aid to the micro-nano bubble generation tanks 6, 23, 37, 49 becomes unnecessary.

However, if the generation state of the micro-nano bubbles is not improved by such measure as changing the types of the micro-nano bubble generators 8, 25, 39, 51, the micro-nano bubble generation aid is added as a last measure.

It is to be noted that specific examples of the micro-nano bubble generation aid include a small amount of alcohol, a slight amount of salts such as common salt, and a small amount of surfactants. In that case, the generation rate of the micro-nano bubbles to the amount of air supplied from the air suction pipes 10, 27, 41, 53 can be increased to about 100%. Furthermore, since the alcohols and salts are easy to remove in the membrane devices in a subsequent stage, they do not have an adverse effect on the membrane devices.

Moreover, in this embodiment, the micro-nano bubble generation aid is supplied from the individual micro-nano bubble generation aid tanks 61, 63, 65, 67 to the first micro-nano bubble generation tank 6, the second micro-nano bubble generation tank 23, the third micro-nano bubble generation tank 37, and the fourth micro-nano bubble generation tank 49. However, the present invention is not limited to this structure but the micro-nano bubble generation aid may be supplied from a common micro-nano bubble generation aid tank with separate metering pumps.

In each of the above embodiments, the treatment tank 1 is placed only in the stage prior to the pretreatment apparatus 19 which constitutes the ultrapure water production apparatus 5. However, the present invention is not limited to this structure, and so the treatment tank including a micro-nano bubble generation tank and an anaerobic measuring tank may also be placed in a stage prior to the primary pure water production apparatus 20, or in a stage prior to the secondary pure water production apparatus 21, so that micro-nano bubbles can lengthen the life of the membranes in the primary pure water production apparatus 20 or in the secondary pure water production apparatus 21 to thereby achieve reduction of running costs.

Moreover, although both the dissolved oxygen meters 13, 30, 44, 56 and the oxidation-reduction potentiometers 14, 31, 45, 57 are placed in each of the anaerobic measuring tanks 7, 24, 38, 50, only either of them may be placed instead.

What is claimed is:
1. A water treatment system, comprising:
a micro-nano bubble generation tank (6, 23, 37, 49) having a micro-nano bubble generator (8, 25, 39, 51) for generating micro-nano bubbles including both micro bubbles and nano bubbles, wherein the micro-nano bubble generation tank receives water introduced from outside and adds the micro-nano bubbles into the introduced water; and an anaerobic measuring tank (7, 24, 38, 50) for applying an anaerobic treatment to the water introduced from the micro-nano bubble generation tank (6, 23, 37, 49) and measuring a content of the micro-nano bubbles in the water under treatment.

2. The water treatment system according to claim 1, comprising an ultrapure water production apparatus (5) having at least a pretreatment apparatus (19), wherein the anaerobic measuring tank (7) is placed in a stage prior to the pretreatment apparatus (19).

3. The water treatment system according to claim 1, comprising an ultrapure water production apparatus (5) having at least a primary pure water production apparatus (20), wherein the anaerobic measuring tank (7, 24) is placed in a stage prior to the primary pure water production apparatus (20).

4. The water treatment system according to claim 1, comprising an ultrapure water production apparatus (5) having at least a primary pure water production apparatus (20) and a secondary pure water production apparatus (21), wherein the anaerobic measuring tank (7, 24) is placed prior to the secondary pure water production apparatus (21).

5. The water treatment system according to claim 1, further comprising:

an ultrapure water production apparatus (5) including a pretreatment apparatus (19), a primary pure water production apparatus (20), and a secondary water production apparatus (21);

an in-plant point of use (22) which is a spot in a plant where ultrapure water produced by the ultrapure water production apparatus (5) is used;

a dilute wastewater recovering apparatus (34) for treating and recovering dilute wastewater generated in the in-plant point of use (22);

a general service water recovering apparatus (47) for treating and recovering concentrated wastewater generated in the in-plant point of use (22);

a cooling tower and scrubber (48) which reuses treated water collected by the general service water recovering apparatus (47);

a wastewater treatment apparatus (59) for treating and discharging concentrated wastewater generated in the in-plant point of use (22); and an activated carbon adsorption apparatus (33) placed in a stage prior to the dilute wastewater recovering apparatus (34), wherein the dilute wastewater generated in the in-plant point of use (22) is introduced and treated in the micro-nano bubble generation tank (23) and the anaerobic measuring tank (24), resultant treated water is treated and recovered by the activated carbon adsorption apparatus (33) and the dilute wastewater recovering apparatus (34), and resultant recovered water is introduced into the primary pure water production apparatus (20) in the ultrapure water production apparatus (5) for reuse.

6. The water treatment system according to claim 5, wherein the concentrated wastewater generated in the in-plant point of use (22) is introduced and treated in the micro-nano bubble generation tank (37) and the anaerobic measuring tank (38), resultant treated water is treated and recovered by the general service water recovering apparatus (47), and resultant recovered water is reused in the cooling tower and scrubber (48).

7. The water treatment system according to claim 5, wherein the concentrated wastewater generated in the in-plant point of use (22) is introduced and treated in the micro-nano bubble generation tank (49) and the anaerobic measuring tank (50), and resultant treated water is treated again by the wastewater treatment apparatus (59) before being discharged.

8. The water treatment system according to claim 1, further comprising a micro-nano bubble generation aid tank (61, 63, 65, 67) for storing a micro-nano bubble generation aid to be added to the micro-nano bubble generation tank (6, 23, 37, 49).

9. The water treatment system according to claim 8, wherein the micro-nano bubble generation aid stored in the micro-nano bubble generation aid tank (61, 63, 65, 67) comprises alcohols or salts including common salt.

10. The water treatment system according to claim 1, wherein a dissolved oxygen meter (13, 30, 44, 56) and/or an oxidation-reduction potentiometer (14, 31, 45, 57) is placed in the anaerobic measuring tank (7, 24, 38, 50).

11. The water treatment system according to claim 1, wherein the anaerobic measuring tank (7, 24, 38, 50) is filled with a polyvinylidene chloride filling (12, 29, 43, 55).

12. The water treatment system according to claim 1, wherein the micro-nano bubble generator (8, 25, 39, 51) in the micro-nano bubble generation tank (6, 23, 37, 49) is a cavitation-type micro-nano bubble generator.

\* \* \* \* \*